Nov. 27, 1956     G. W. SCHROEDER     2,772,340
SURFACE HEATING UNIT
Filed Oct. 11, 1954

INVENTOR.
GEORGE W. SCHROEDER
BY
HIS ATTORNEY

United States Patent Office 2,772,340
Patented Nov. 27, 1956

2,772,340

SURFACE HEATING UNIT

George W. Schroeder, Louisville, Ky., assignor to General Electric Company, a corporation of New York Application October 11, 1954, Serial No. 461,559

5 Claims. (Cl. 219—37)

This invention relates to automatically controlled surface heating units of the type used on electric ranges and the like, and has as its principal object the provision of a surface heating unit having a drip pan assembly arranged to improve both the efficiency of the unit and the sensitivity of a temperature detector associated therewith.

Further objects and advantages of my invention will become apparent as the following description proceeds, and the features of novelty which characterize my invention will be pointed out with particularity in the claims annexed to and forming a part of this specification.

Briefly stated, in accordance with one aspect of my invention I provide a surface heating unit having a temperature sensing device centrally located therein so as to contact the bottom of a utensil resting thereon, and a generally concave reflector pan having a central opening defined by an integral upwardly projecting tubular portion surrounding and shielding the control device from the adjacent portions of the heating element. The reflector pan is resiliently mounted so as to be biased upwardly whereby a horizontal flange on the tubular portion is biased into intimate contact with the bottom of the utensil. Thus heat absorbed by the temperature sensing device more accurately responds to utensil temperature since it is shielded from the innermost portions of the heating element.

For a better understanding of my invention reference may be made to the accompanying drawing in which.

Figure 1:
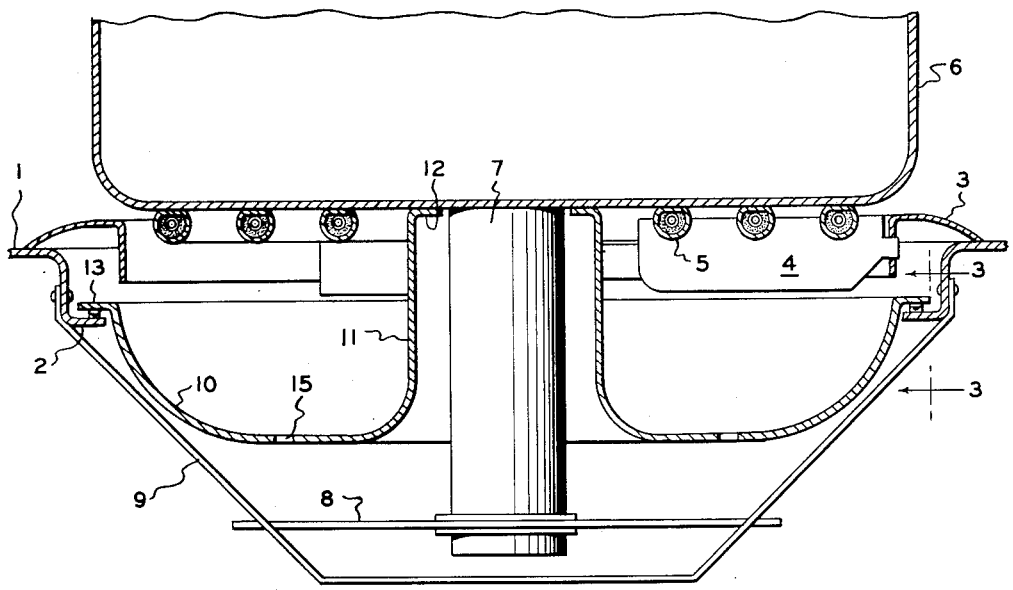
Fig. 1 is a cross-sectional view of a surface heating unit constructed in accordance with my invention.
Figure 2:
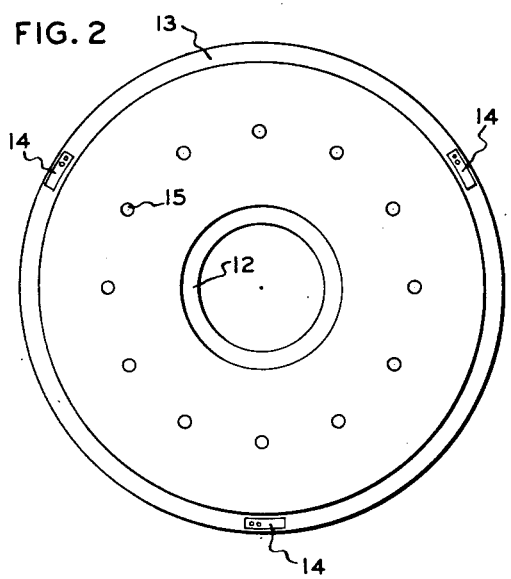
Fig. 2 is a bottom plan view of the reflector pan.
Figure 3:
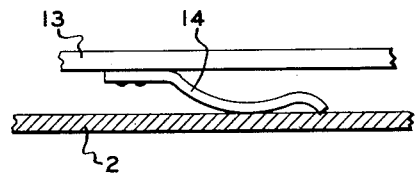
Fig. 3 is a fragmentary sectional view taken along the line 3—3 in Fig. 1.

Referring to the drawing, the numeral 1 designates the cooking top of an electric range having a circular opening for a surface heating unit defined by a depending horizontally extending flange 2. Supported on cooking top 1 by means of a trim ring 3 and a spider frame 4 is a tubular sheath heating element 5 coiled in flat spiral form as to provide a grid for supporting a cooking utensil 6. The structure thus far described is of course well known in the art and is to be considered as typical of the surface heating units commonly found in electric ranges. Heating element 5 is of course provided with terminals and wiring connections (not shown), and the energization of the heating element is automatically controlled in accordance with the temperature of utensil 6 by a suitable control system including a temperature sensing device 7 centrally located in the heating element so as to contact the bottom of the utensil. A suitable control system which may be utilized with sensing device 7 is disclosed in application Serial No. 382,423, filed September 25, 1953, by Stanley B. Welch. Temperature detector 7 is spring biased upwardly toward utensil 6 by resilient mounting means carried by the cooking top 1 including a flat spring 8 supported near its ends by a strap 9 secured to the cooking top 1. As shown in Fig. 1, the lower end of detector 7 is clamped to the middle portion of spring 8 and is capable of limited vertical movement, being positioned so as to extend somewhat above the plane of heating element 5 when utensil 6 is removed therefrom. Thus it will be seen that control device 7 is held in intimate heat transfer relationship with the bottom of a utensil resting on the heating element and thus provides a means for detecting the temperature of the utensil.

While a substantial portion of the heat generated in heating element 5 is transferred by conduction to utensil 6 some heat is of course radiated downwardly by the tubular sheath. And although a drip pan having a reflective surface is commonly mounted below the heating element, most of this heat is not returned to the utensil because the pan usually becomes soiled and becomes a poor reflector. Furthermore heat radiated from the innermost turn of heating element 5 would, in the absence of a suitable shield, raise the temperature of detecting device 7 thus causing an erroneous temperature signal. In accordance with the present invention I provide a generally concave drip pan formed of material having high heat conductivity, such as aluminum, with a central opening defined by an upwardly projecting tubular portion or member 11 surrounding detector 7. The upper end of tubular portion 11 terminates in a horizontal flange 12 located above the plane of heating element 5 and thus in a position to be contacted by the bottom of a utensil placed thereon. To resiliently support drip pan 10 below heating element 5 the pan is provided with a peripheral flange 13 which overlies depending flange 2 and is supported thereon by three leaf springs 14 secured as by riveting to flange 13. If desired drip pan 10 may be provided with spillage and ventilation holes 15. To facilitate heat transfer, tubular member 11 is preferably an integral part of the drip pan, as shown, in which case the pan may be made by a drawing or spinning operation.

By means of tubular member 11, radiation from the inner turns of heating element 5 toward temperature sensing device 7 are blocked and are thus prevented from influencing the temperature signal transmitted to the control system of the unit. Furthermore heat absorbed by drip pan 10 is constantly transferred to the utensil by reflection, reradiation or conduction, flange 12 providing intimate thermal contact between tubular portion 11 and the bottom of the utensil. Tubular member 11 also helps to maintain temperature sensing device 7 at the temperature of the utensil by enclosing an air space surrounding the sensing device.

It will be noted that the peripheral flange 13 of pan 10 is supported at only three points on depending flange 2 and hence heat transfer from pan 10 to cooking top 1 is minimized. As previously stated, flange 12 is in intimate thermal contact with the utensil resting on the heating unit and hence as the temperature of the drip pan increases heat will flow up tubular portion 11 and into the utensil.

From the foregoing description it will be seen that I have provided a surface heating unit including an improved drip pan which recovers heat radiated from the bottom of the heating element and conducts it to the cooking utensil and also shields a centrally located temperature sensing device and helps to maintain it at utensil temperature. While the present invention is particularly adapted for use in conjunction with surface heating units of an electric range it is not limited solely to this one application and may be used in various types of cooking units and hot plates other than those mounted on a range cooking top. Further, it may be applied to gas-fired surface cooking units as well as electric units.

While I have shown and described a specific embodiment of my invention, I do not desire my invention to be limited to the particular construction shown and described and I intend by the appended claims to cover all modifications within the true spirit and scope of the invention.

I claim as my invention:

1. In a surface heating unit including a horizontally disposed utensil supporting grid and a temperature sensing device centrally located therein so as to contact the bottom of a utensil resting on said grid, a generally concave drip pan of high thermal conductivity having a central opening defined by an upwardly projecting tubular portion surrounding said sensing device, the upper end of said tubular portion terminating in a horizontal flange above the plane of said grid, and spring means for resiliently supporting said pan so that said horizontal flange is biased into contact with the bottom of said utensil.

2. In a surface heating unit including a horizontally disposed utensil supporting grid and a temperature sensing device centrally located therein so as to contact the bottom of a utensil resting on said grid, a generally concave drip pan formed of a material having high heat conductivity, said pan having a peripheral flange and a central opening defined by an upwardly projecting tubular portion surrounding said sensing device, the upper end of said tubular portion terminating in a horizontal flange above the plane of said grid, and spring means in contact with said peripheral flange for resiliently supporting said pan so that said horizontal flange is biased into contact with the bottom of said utensil.

3. In a surface heating unit including frame structure supporting a horizontally disposed grid and a temperature sensing device centrally located therein so as to contact the bottom of a utensil resting on said grid, a generally concave drip pan formed of a material having high heat conductivity, said pan having a peripheral flange and a central opening defined by an upwardly projecting tubular portion surrounding said sensing device, the upper end of said tubular portion terminating in a horizontal flange above the plane of said grid, and spring means for resiliently supporting said peripheral flange on said frame structure so that said horizontal flange is biased into contact with the bottom of said utensil.

4. In a surface heating unit including frame structure supporting a horizontally disposed grid and a temperature sensing device centrally located therein so as to contact the bottom of a utensil resting on the said grid, a generally concave drip pan formed of a material having high heat conductivity, said pan having a peripheral flange and a central opening defined by an integral upwardly projecting tubular portion surrounding said sensing device, the upper end of said tubular portion terminating in a horizontal flange above the plane of said grid, and a plurality of springs carried by said peripheral flange and engaging said frame structure for resiliently supporting said pan below said grid so that said horizontal flange is biased into contact with the bottom of said utensil.

5. A surface heating unit for electric ranges and the like comprising a cooking top having a circular opening defined by a depending horizontally disposed flange, a tubular sheath heating element coiled in flat spiral form about a central opening, a spider supporting said heating element on said cooking top, a temperature sensing device located in said opening, said sensing device being spring biased upwardly by resilient mounting means carried by said cooking top, a generally concave drip pan formed of material having high heat conductivity supported below said heating element, said drip pan having a peripheral flange overlying said depending flange and a central opening defined by an integral upwardly projecting tubular member surrounding said sensing device, the upper end of said tubular member terminating in a horizontal flange above the plane of said heating element, and a plurality of springs secured to the under surface of said peripheral flange so as to engage said depending flange and support said pan so that said horizontal flange is biased into contact with the bottom of a utensil placed on said heating element.

References Cited in the file of this patent

UNITED STATES PATENTS

| 2,534,097 | Akeley | Dec. 12, 1950 |
| 2,699,487 | Turner | Jan. 11, 1955 |

FOREIGN PATENTS

| 461,412 | Canada | Nov. 29, 1949 |